United States Patent
Saito et al.

(10) Patent No.: US 10,228,269 B2
(45) Date of Patent: Mar. 12, 2019

(54) SENSOR UNIT HAVING AN ADHESIVE MEMBER CONNECTED TO AN OUTER EDGE OF A SENSOR DEVICE AND PLACED CONTINUOUSLY IN AN AREA OVERLAPPING A SENSOR DEVICE

(71) Applicant: Seiko Epson Corporation, Tokyo (JP)

(72) Inventors: Yoshikuni Saito, Suwa (JP); Yusuke Kinoshita, Minowa (JP); Keita Ito, Chino (JP)

(73) Assignee: Seiko Epson Corportion (JP)

( * ) Notice: Subject to any disclaimer, the term of this patent is extended or adjusted under 35 U.S.C. 154(b) by 233 days.

(21) Appl. No.: 15/246,879

(22) Filed: Aug. 25, 2016

(65) Prior Publication Data

US 2017/0059605 A1    Mar. 2, 2017

(30) Foreign Application Priority Data

Sep. 2, 2015   (JP) ................................ 2015-172605

(51) Int. Cl.
| | | |
|---|---|---|
| *G01P 1/02* | (2006.01) | |
| *G01C 19/5783* | (2012.01) | |
| *G01D 11/24* | (2006.01) | |

(52) U.S. Cl.
CPC ....... *G01D 11/245* (2013.01); *G01C 19/5783* (2013.01); *G01P 1/023* (2013.01)

(58) Field of Classification Search
CPC ...... G01P 15/02; G01P 15/09; G01P 15/0802; G01D 11/245; G01S 7/521; G10K 11/004; H05K 5/06; F04B 49/02; G01C 19/5769; G01C 19/5755; Y10T 29/42; F04D 15/0218; F04D 13/08; G01F 13/08; G01F 23/268; G01F 23/266

See application file for complete search history.

(56) References Cited

U.S. PATENT DOCUMENTS

| | | | | |
|---|---|---|---|---|
| 5,773,881 A | * | 6/1998 | Kato ...................... | G01P 1/023 257/417 |
| 8,459,108 B2 | * | 6/2013 | Ohta ...................... | G01C 19/56 73/493 |
| 2011/0110792 A1 | * | 5/2011 | Mauro .................... | F04B 49/02 417/44.1 |
| 2011/0210407 A1 | * | 9/2011 | Katayama .......... | C08G 73/1046 257/414 |
| 2013/0014578 A1 | * | 1/2013 | Sakuma ............. | G01C 19/5769 73/431 |
| 2017/0176186 A1 | * | 6/2017 | Yoshiuchi .......... | G01C 19/5769 |
| 2017/0191832 A1 | * | 7/2017 | Kinoshita .......... | G01C 19/5783 |

FOREIGN PATENT DOCUMENTS

| | | |
|---|---|---|
| JP | 2006-153799 A | 6/2006 |
| JP | 2012-117933 A | 6/2012 |
| WO | WO-2008-084820 A1 | 7/2008 |

\* cited by examiner

*Primary Examiner* — Harshad R Patel
*Assistant Examiner* — Brandi N Hopkins
(74) *Attorney, Agent, or Firm* — Harness, Dickey & Pierce, P.L.C.

(57) ABSTRACT

A sensor unit includes: a sensor device including an inertial sensor; a substrate to which the sensor device is bonded; a case member accommodating at least the sensor device; and an adhesive member provided to cover, in a plan view of the substrate as viewed from the case member side, an outer periphery of the sensor device and so as to connect the sensor device with the case member.

10 Claims, 8 Drawing Sheets

SENSOR UNIT HAVING AN ADHESIVE MEMBER CONNECTED TO AN OUTER EDGE OF A SENSOR DEVICE AND PLACED CONTINUOUSLY IN AN AREA OVERLAPPING A SENSOR DEVICE

BACKGROUND

1. Technical Field

The present invention relates to a sensor unit, and an electronic apparatus and a moving object including the sensor unit.

2. Related Art

In the related art, a sensor unit is known in which a substrate on which a sensor device including an inertial sensor, such as an acceleration sensor or an angular velocity sensor, which is resin-sealed by a sealing resin, and other electronic components are mounted is accommodated in a case member including a lid member such that at least the sensor device is covered by the lid member. The sensor unit is incorporated into various electronic apparatuses or machines or mounted in a moving object such as an automobile, and is used to, for example, perform the monitoring of the amount of inertia such as acceleration or angular velocity. Here, when external vibration or impact exceeding a predetermined intensity is applied to the sensor unit, or when external vibration or impact is applied thereto for more than a predetermined time, an inertial component of the vibration or impact is superimposed on the vibration of the inertial sensor, and thus the detection accuracy for the amount of inertia is reduced.

As a sensor unit capable of solving such a problem, for example, JP-A-2006-153799 shows a sensor unit having a configuration in which a substrate on which a sensor device is mounted is supported to a case member (package) through an adhesive member (adhesive) and the sensor device mounted on the substrate is covered by the adhesive member. For the adhesive member, a material whose modulus of elasticity, thermal conductivity, and dielectric constant can be reduced after solidification is used. With this configuration, propagation of the external vibration or impact, heat, or an electromagnetic wave to the sensor device (inertial sensor) is suppressed, and thus it is possible to suppress a reduction in the detection accuracy for the amount of inertia.

In the sensor device, the present inventor has found that, in addition to the problem described above, even when the sensor device is returned to a normal temperature after being exposed to a high temperature environment, the detected value of the amount of inertia continues to change, and thus the detection accuracy is reduced in some cases. The present inventor has found that the reasons for this are that the substrate, the sensor device (sealing resin), and the case member including the lid member are deformed due to thermal stress when heated to a high temperature, and differences occur, when returned to a normal temperature, in the return of the members from the deformation due to the thermal stress because of differences among linear expansion coefficients of the respective members, and that since the deformation (return) of the members continues for a predetermined time after the members are returned to a normal temperature, stress continues to be applied to the sensor device (inertial sensor) and thus affects a change in the detected value of the inertial sensor over time.

In the configuration of the sensor unit disclosed in JP-A-2006-153799, the adhesive member supporting the substrate on which the sensor device is mounted in the case member and covering the sensor device mounted on the substrate is not connected to the inner wall of the case member due to the presence of a space between the inner wall of the case member and the adhesive member. Therefore, there is a problem in that after the members are returned to a normal temperature after being exposed to a high temperature environment, it may be impossible to suppress the change in the detected value of the amount of inertia over time caused by the occurrence of thermal stress in the members.

SUMMARY

An advantage of some aspects of the invention is to solve at least a part of the problems described above, and the invention can be implemented as the following forms or application examples.

Application Example 1

A sensor unit according to this application example includes: a sensor device including an inertial sensor; a substrate to which the sensor device is bonded; a case member accommodating at least a portion of the sensor device; and an adhesive member bonding the sensor device and the case member together and bonding the substrate and the case member together, wherein the adhesive member is disposed, in a plan view of the substrate as viewed from the case member side, continuously in an area overlapping the sensor device and in an outer peripheral area connected to an outer edge of the sensor device.

According to this application example, in the plan view as viewed from the side of the case member covering the sensor device bonded to the substrate, the adhesive member is provided continuously in the area overlapping the sensor device and in the outer peripheral area connected to the outer edge of the sensor device. With this configuration, since the substrate and the sensor device bonded to the substrate are securely held by the adhesive member, the deformation of the members when heated to a high temperature is less likely to occur. Therefore, stress applied to the sensor device during heating and during cooling in which the sensor device is returned to a normal temperature is suppressed.

Hence, a change in the detected value of the inertial sensor over time is suppressed when the sensor unit is exposed to a high temperature or after the sensor unit is returned from a high temperature to a normal temperature. Therefore, it is possible to provide the sensor unit capable of detecting an accurate amount of inertia even when exposed to temperature changes.

Application Example 2

In the sensor unit according to the application example, it is preferable that the sensor device includes a sealing resin sealing the inertial sensor and electrodes connected to the inertial sensor and disposed on an outer surface of the sealing resin, and that the adhesive member is disposed so as to cover an entire outer surface of the sensor device except for a surface facing the substrate.

According to this application example, since the substrate and the sensor device are more securely held by the adhesive member, the change in the detected value of the inertial sensor over time is suppressed even when exposed to a high temperature, and thus it is possible to provide the sensor unit capable of detecting a more accurate amount of inertia.

Application Example 3

In the sensor unit according to the application example, it is preferable that the substrate includes a first surface and a second surface in an opposing relationship with each other, and a side surface connecting the first surface with the second surface, and that, when a direction along the first surface and the second surface is defined as a first direction, a linear expansion coefficient of the adhesive member in the first direction is larger than linear expansion coefficients of the substrate and the case member in the first direction.

According to this application example, the substrate and the inner wall of the case member facing the substrate are connected by means of the adhesive member whose linear expansion coefficient is larger than those of the substrate and the case member. Therefore, the deformation of the substrate or the occurrence of stress in association with the deformation, when the sensor unit is exposed to temperature changes such as those that occur during heating to a high temperature and during cooling after heating, is further suppressed, and thus it is possible to provide the sensor unit in which a reduction in the detected value of the amount of inertia due to temperature changes is suppressed.

Application Example 4

In the sensor unit according to the application example, it is preferable that a linear expansion coefficient of the adhesive member in the first direction is four times or less a linear expansion coefficient of the substrate or the case member in the first direction, whichever is larger.

The present inventor has found that, according to this application example, a reduction in the detected value of the amount of inertia due to the deformation of the members or the occurrence of stress in association with the deformation during heating to a high temperature and during cooling after heating is more remarkably suppressed.

Application Example 5

In the sensor unit according to the application example, it is preferable that a linear expansion coefficient of the substrate in the first direction and a linear expansion coefficient of the sealing resin of the sensor device in the first direction are substantially the same as each other. Here, the term "substantially the same" means that a difference between the linear expansion coefficients falls within ±10% of one of the values.

According to this application example, the deformation of the members or the occurrence of stress in association with the deformation caused by the difference in linear expansion coefficient between the substrate and the sensor device is suppressed, and thus it is possible to suppress a reduction in the detected value of the amount of inertia due to temperature changes.

Application Example 6

In the sensor unit according to the application example, it is preferable that, between a thickness $h1$ of the sensor device and a thickness $h2$ of the adhesive member in an area where the substrate and the case member are connected together in a normal direction of the first surface, the relationship: $h2/h1 \leq 2$ is established.

According to this application example, the deformation of the members or the occurrence of stress in association with the deformation caused by the difference in linear expansion coefficient between the substrate and the sensor device is suppressed, and thus it is possible to suppress a reduction in the detected value of the amount of inertia due to temperature changes.

Application Example 7

In the sensor unit according to the application example, it is preferable that the substrate includes conductive terminals disposed along an outline of the first surface, and that the sensor unit further includes a side-surface disposed sensor device fixed to the substrate such that the outer surface faces the side surface of the substrate and the electrodes disposed on the outer surface and the conductive terminals are bonded together with conductors.

According to this application example, the side-surface disposed sensor device is bonded to the side surface connecting the first surface with the second surface of the substrate, and the adhesive member is provided so as to connect the sensor device with the case member. With this configuration, since an interior space of the case member can be efficiently used, it is possible to realize the sensor unit of small size.

Moreover, when another sensor device is bonded on the first surface side of the substrate and the adhesive member is disposed so as to connect the sensor device with the case member, the first surface side and the side surface of the substrate are bonded to the case member by means of the adhesive member. Therefore, the substrate is more securely held with respect to the case member.

Hence, it is possible to more remarkably suppress a reduction in the detected value of the amount of inertia due to the deformation of the members or the occurrence of stress in association with the deformation during heating to a high temperature and during cooling after heating.

Application Example 8

In the sensor unit according to the application example, it is preferable that the side-surface disposed sensor device is an angular velocity sensor disposed to detect an angular velocity about an axis along the first direction.

According to this application example, it is possible to provide the sensor unit of small size and capable of detecting with high accuracy angular velocities about a plurality of axes.

Application Example 9

An electronic apparatus according to this application example includes the sensor unit according to the application example.

According to this application example, the electronic apparatus includes the sensor unit in which stress applied to the sensor device due to deformation occurring in the members of the sensor unit and stress fluctuation or the like in association with the deformation, during heating to a high temperature or during cooling from a high temperature to a normal temperature, is suppressed and thus which can perform more stable measurement. Also, in the sensor unit, variations in the detection axis of the sensor device are suppressed and thus the detection accuracy of the inertial sensor is improved. Therefore, it is possible to provide the electronic apparatus with higher reliability.

Application Example 10

A moving object according to this application example includes the sensor unit according to the application example.

According to this application example, the moving object includes the sensor unit in which stress applied to the sensor device due to deformation occurring in the members of the sensor unit and stress fluctuation or the like in association with the deformation, during heating to a high temperature or during cooling from a high temperature to a normal temperature, is suppressed and thus which can perform more stable measurement. Also, in the sensor unit, variations in the detection axis of the sensor device are suppressed and thus the detection accuracy of the inertial sensor is improved. Therefore, it is possible to provide the moving object with higher reliability.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
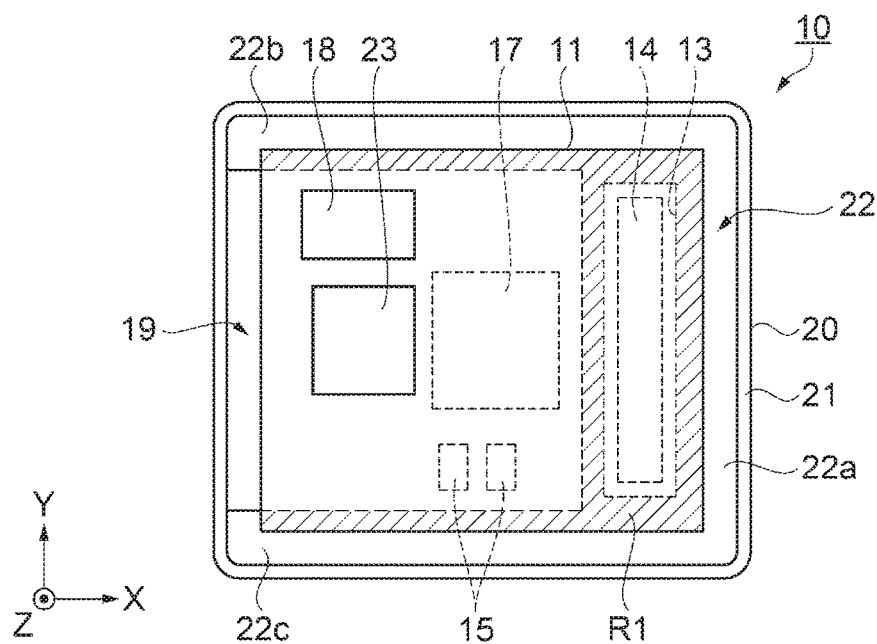
FIG. 1 is a plan view showing a schematic configuration of a sensor unit according to a first embodiment.

Hereinafter, embodiments according to the invention will be described with reference to the drawings. In the drawings below, layers and members may be shown in scales different from actual ones in order to show the layers and the members in recognizable size.

First Embodiment

Configuration of Sensor Unit

Figure 2:
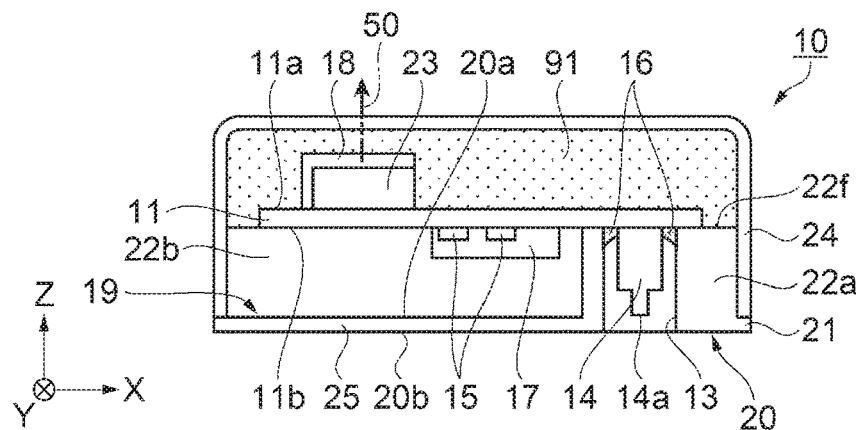
FIG. 2 is a front cross-sectional view showing a schematic configuration of the sensor unit according to the first embodiment.
Figure 3:
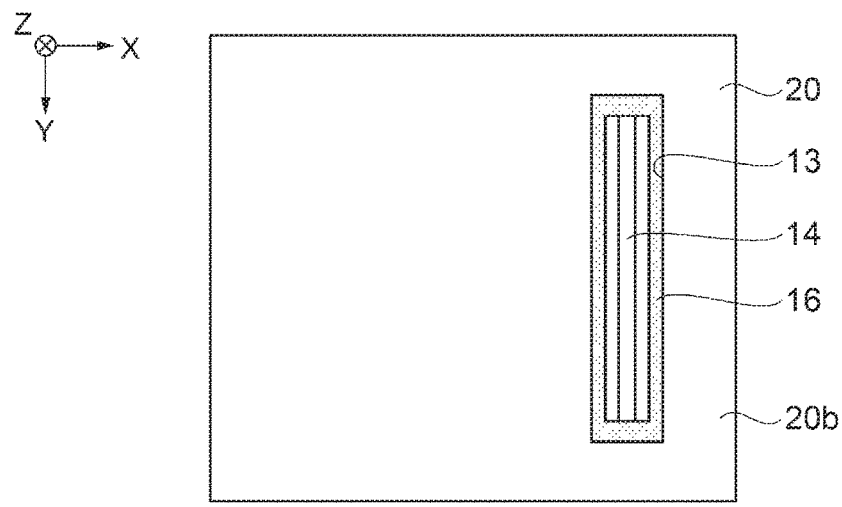
FIG. 3 is a bottom plan view showing a schematic configuration of the sensor unit according to the first embodiment.
Figure 4:
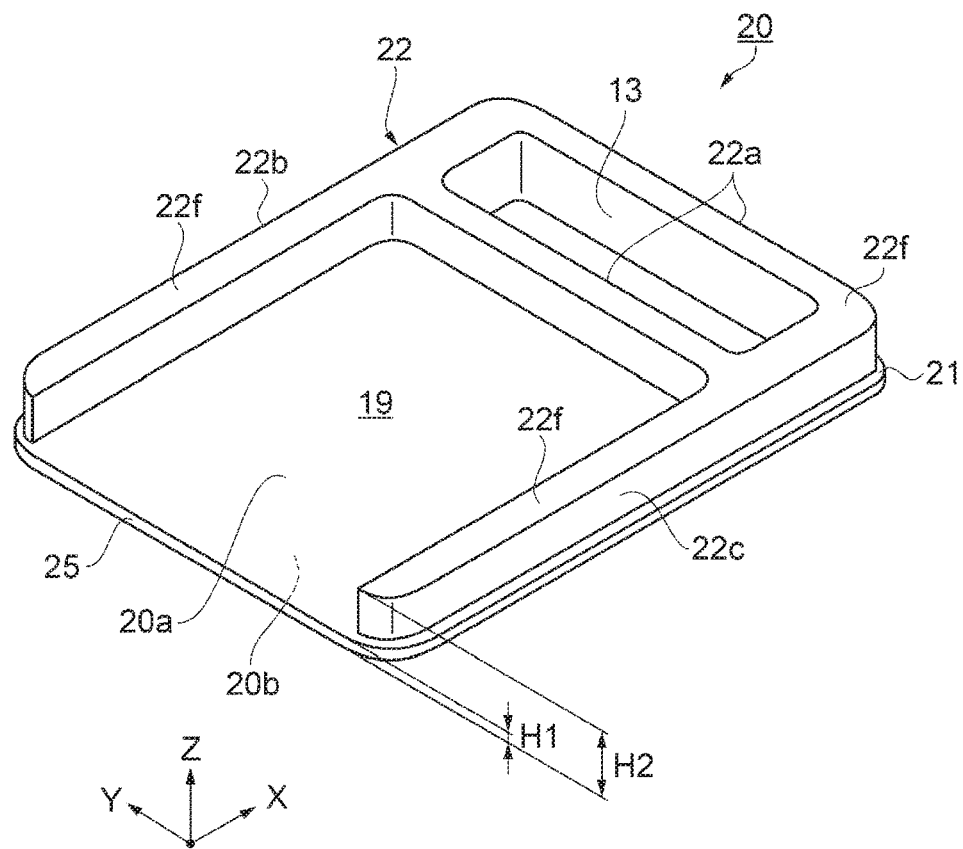
FIG. 4 is a perspective view showing an overview of a pedestal in the first embodiment.

FIGS. 1 to 3 are diagrams schematically showing an external appearance of a sensor unit according to a first embodiment, in which FIG. 1 is a plan view, FIG. 2 is a front cross-sectional view, and FIG. 3 is a bottom plan view. In FIG. 1, a cap as a case member is omitted for clarity of illustration. FIG. 4 is a perspective view showing an overview of a pedestal in the first embodiment.

As shown in FIG. 1, the sensor unit 10 according to the first embodiment includes a substrate 11 provided with a first sensor device 23 as a sensor device and a connector 14 connected to the first sensor device 23, and the pedestal 20 on which the substrate 11 is placed and which includes a through-hole 13 as an opening through which the connector 14 is exposed. Moreover, the sensor unit 10 includes the cap 24 as a case member (lid member) connected to the pedestal 20 and covering the substrate 11. The first sensor device 23 is disposed in a position overlapping, in a plan view (as viewed in the Z-axis direction shown in the drawing), a component accommodating portion 19 as a gap provided between the substrate 11 and the pedestal 20. In the embodiment, an example of using an inertial sensor as the first sensor device will be described. Hereinafter, the constituent members including other constituent members will be described in detail.

Substrate

The substrate 11 is provided with major surfaces on the front and rear thereof. The substrate 11 includes a first surface 11a as one of the major surfaces, a second surface 11b as the other major surface which is in an opposing relationship with the first surface 11a, and a side surface connecting the first surface 11a with the second surface 11b. The substrate 11 is connected with substrate bonding portions 22a, 22b, and 22c of the pedestal 20, described later, in the position of a connection area R1 indicated by hatching in the drawing. The substrate 11 is formed of an insulator such as, for example, resin or ceramic. Wiring patterns (mounting wiring lines, conductive terminals, electrodes, etc.) formed from a conductive material through, for example, plating deposition are formed on the first surface 11a and the second surface 11b of the substrate 11, but the wiring patterns are not shown in the drawings. In the following description of the embodiment, a direction along the first surface 11a and the second surface 11b may be referred to as "first direction".

The first sensor device 23 and a second sensor device 18 as a sensor device are mounted in an area overlapping the component accommodating portion 19 in the plan view (viewed in the Z-axis direction), on the first surface 11a of the substrate 11 connected to the pedestal 20. The first sensor device 23 as an inertial sensor has a flat, substantially rectangular parallelepiped outer shape, and the outline of the outer surface is formed into an oblong shape. External electrodes as a plurality of electrodes (not shown) are disposed on the outer surface of the first sensor device 23. The first sensor device 23 is located in the area overlapping the component accommodating portion 19 in the plan view, and is disposed with the bottom surface as an outer surface lying on the first surface 11a of the substrate 11. The first sensor device 23 is mounted on the substrate 11 while electrical connections are provided between the electrodes provided on the outer surface and the conductive terminals provided on the substrate 11. For connection in mounting, a bonding material such as, for example, a solder material is used. The first sensor device 23 is composed of an angular velocity sensor having one detection axis 50, that is, a gyro sensor. In the angular velocity sensor, the detection axis 50 is orthogonal to the bottom surface, and an angular velocity about the detection axis 50 is detected. In the example, a configuration of using one first sensor device 23 as an angular velocity sensor is illustrated; however, a configuration can be employed in which angular velocities about detection axes in multiaxial directions can be detected using a plurality of sensor devices similar to the first sensor device 23, as in a second embodiment described later. For example, in the case of detecting angular velocities in triaxial directions orthogonal to one another, the detection can be realized by mounting the sensor devices on the substrate 11 with the bottom surfaces of the sensor devices facing in the three directions orthogonal to one another.

The second sensor device 18 is composed of, for example, an acceleration sensor. In the example, a sensor capable of detecting an acceleration in a uniaxial (the detection axis 50) direction is illustrated, and an acceleration can be detected along the detection axis 50. Here, the detection axis 50 of the second sensor device 18 as an acceleration sensor lies along a second direction crossing ("orthogonal to" in the embodiment) the first direction described above. The second sensor device 18 may be composed of, for example, a triaxial acceleration sensor capable of detecting accelerations in multiaxial directions. When the triaxial acceleration sensor is used, an acceleration can be detected along three orthogonal axes.

An adhesive member 91 is provided in a space formed by the first surface 11a of the substrate 11 on which the first sensor device 23 and the second sensor device 18 are mounted and the cap 24 as a case member. The adhesive member 91 is provided to cover the inner wall of the cap 24 accommodating at least the first sensor device 23 and the second sensor device 18 and the outer peripheries of the first sensor device 23 and the second sensor device 18 in a plan view of the substrate 11 as viewed from the cap 24 side, and so as to connect the first sensor device 23 and the second sensor device 18 with the cap 24. In the embodiment, the adhesive member 91 is filled and solidified in the entire space formed by the first surface 11a of the substrate 11 on which the first sensor device 23 and the second sensor device 18 are mounted and the cap 24 as a case member. The manufacturing process of the sensor unit 10 realizing such a filling state of the adhesive member 91 will be described later.

The connector 14, other electronic components 15 such as a chip resistor and a chip capacitor, an IC chip (integrated circuit) 17, and the like are mounted on the second surface 11b, which is one of the major surfaces of the substrate 11 and in an opposing relationship with the first surface 11a. For connection in mounting, a bonding material such as, for example, a solder material is used. The chip resistor or the chip capacitor may be used to improve output characteristics from the sensor device. Moreover, the connector 14, the other electronic components 15, the IC chip (integrated circuit) 17, and the like are electrically connected to each other by the wiring patterns (not shown). The connector 14 is attached to the second surface 11b of the substrate 11 such that the bottom surface (fixed surface) of the connector 14 is disposed so as to lie on the second surface 11b of the substrate 11. The connector 14 is attached in this manner, so that the direction of the detection axis 50 of the first sensor device 23 and the insertion direction of the connector 14 can be aligned through the substrate 11.

In the above description, an example has been described, in which the first sensor device 23 and the second sensor device 18 are mounted on the first surface 11a of the substrate 11 while the connector 14, the electronic components 15, the IC chip (integrated circuit) 17, and the like are mounted on the second surface 11b; however, the mounting surfaces and combinations are not specified. For example, a configuration may be employed, in which the electronic components 15, the IC chip (integrated circuit) 17, and the like are mounted on the first surface 11a while the connector 14, the first sensor device 23, the second sensor device 18, and the like are mounted on the second surface 11b. In this case, in a space formed by the second surface 11b side of the substrate 11 on which the first sensor device 23 and the second sensor device 18 are mounted and the component accommodating portion 19 of the pedestal 20 functioning as a case member, the adhesive member 91 is provided to cover the outer peripheries of at least the first sensor device 23 and the second sensor device 18 and so as to connect the first sensor device 23 and the second sensor device 18 with the inner wall of the component accommodating portion 19 of the pedestal 20.

Pedestal

Here, the pedestal 20 will be described in detail with reference also to FIG. 4. The pedestal 20 is provided so as to face the second surface 11b of the substrate 11. The pedestal 20 is provided with a plate-like base 25 provided so as to face the second surface 11b of the substrate 11, and the substrate bonding portions 22a, 22b, and 22c projecting from the base 25 toward the second surface 11b of the substrate 11 along the outer periphery of the base 25. The pedestal 20 includes a lower surface (outer bottom surface) 20b, an upper surface 20a that is in an opposing relationship with the lower surface 20b and is the inner bottom surface of the base 25, and bonding surfaces 22f that are upper surfaces of the substrate bonding portions 22a, 22b, and 22c and bonded to the substrate 11. The bonding surfaces 22f of the substrate bonding portions 22a, 22b, and 22c are formed flush with each other.

The substrate bonding portions 22a, 22b, and 22c have a thickness H2 (wall thickness: a thickness between the bonding surface 22f and the lower surface 20b) larger than a thickness H1 (wall thickness: a thickness between the upper surface 20a and the lower surface 20b) of the base 25. That is, the substrate bonding portions 22a, 22b, and 22c project from the upper surface 20a of the base 25. In the example, a projecting portion 22 is formed of the substrate bonding portion 22a located at an edge portion in the X-axis direction and extending in the Y-axis direction, and the substrate bonding portions 22b and 22c located at both edge portions in the Y-axis direction and extending in the X-axis direction. A space area formed by the inner side surfaces of the substrate bonding portions 22a, 22b, and 22c projecting and the upper surface 20a of the base 25 serves as the component accommodating portion 19.

The through-hole 13 penetrating from the bonding surface 22f to the lower surface 20b is provided in the substrate bonding portion 22a of the pedestal 20. The through-hole 13 is provided to accommodate the connector 14 connected to the substrate 11 when the substrate 11 is connected to the pedestal 20 as will be described later. The through-hole 13 is a hole having a shape slightly larger than the outer shape of the connector 14. The through-hole 13 of the example is a hole having a rectangular opening. Further, the pedestal 20 is provided with a flange 21 provided in a thin-walled shape at the outer peripheral edge portion of the base 25.

In the connection area R1 including the outer peripheral portion of the substrate 11 and the outer peripheral portion of the through-hole 13 into which the connector 14 is inserted, the substrate 11 is connected on the substrate bonding portions 22a, 22b, and 22c, and thus the substrate 11 is supported on the pedestal 20. The connection method of the substrate 11 is not particularly limited, and for example, connection with an adhesive, fixation by screwing, or the like can be used. A combination of fixation with an adhesive and screwing is preferably used, which makes it possible to reliably fix the substrate 11 to the projecting portion 22. Moreover, since a layer of adhesive is present between the pedestal 20 and the substrate 11, the adhesive absorbs and reduces vibration from the pedestal 20, and thus unwanted vibration of the substrate 11 is suppressed. As a result, detection accuracy of the sensor unit 10 is further improved.

It is sufficient for the substrate bonding portions 22a, 22b, and 22c to extend in at least two directions crossing each other, and the substrate bonding portions 22a, 22b, and 22c can reliably connect the substrate 11. For example, a plurality of protruding portions may be provided in each of the X-axis direction and the Y-axis direction, or a configuration may be employed in which one protruding portion extending from the central portion of the substrate bonding portion 22a in the Y-axis direction toward the X-axis direction is provided. Since the substrate 11 is bonded and supported at the outer peripheral portion thereof to the substrate bonding portions 22a, 22b, and 22c provided around the component accommodating portion 19 as described above, fluttering or flexing of the substrate 11 is suppressed, and thus detachment of the connector 14 connected to the substrate 11 can be more smoothly performed reliably. Moreover, since the substrate 11 and the pedestal 20 are bonded together around the connector 14, the substrate 11 is less flexible around a portion thereof at which the connector 14 is connected, and thus detachment of the connector 14 can be more smoothly performed reliably.

The height of the projecting portion 22 based on the upper surface 20a is set such that, when the substrate 11 is connected to the projecting portion 22, an input/output surface 14a of the connector 14 is contained within the through-hole 13. In other words, when the substrate is connected to the projecting portion 22, the input/output surface 14a of the connector 14 is located on the inside (the upper surface 20a side) of the lower surface 20b (lower surface of the pedestal 20) of the base 25. With the configuration described above, even when the unexpected happens, the connector 14 can be prevented from being subjected to an impact or load, and the breakage of the connector 14 can be prevented. A filling material 16 is disposed in a gap between the through-hole 13 and the outer peripheral portion of the connector 14. Since the gap is filled with the filling material 16 as described above, the opening to the lower surface (the lower surface 20b of the base 25) of the pedestal 20 is closed. Therefore, it is possible to prevent the entry of a foreign substance such as moisture or dust from the lower surface side of the pedestal 20 into the component accommodating portion 19 as a gap provided between the substrate 11 and the pedestal 20.

By configuring the pedestal 20 as described above, the substrate 11 can be easily supported, and also the space (the component accommodating portion 19) for accommodating the other electronic components 15 such as a chip resistor and a chip capacitor, the IC chip (integrated circuit) 17, and the like can be secured between the substrate 11 and the base 25. When the substrate 11 is fixed as described above, a space is formed between the substrate 11 and the base 25, and the electronic components 15, the IC chip (integrated circuit) 17, and the like are accommodated in the space. With this configuration, contact between these components and the pedestal 20 is prevented, and the reliability of the sensor unit 10 is improved. Moreover, the cap 24 as a case member described later is bonded to the flange 21. The cap 24 can be easily bonded to the pedestal 20 using, for example, a resin adhesive containing an epoxy resin as a base material.

The constituent material of the pedestal 20 is not particularly limited, but is preferably a material having damping characteristics. With this configuration, unwanted vibration of the substrate 11 is suppressed, which improves detection accuracy of the first sensor device 23, the second sensor device 18, and the like. Examples of the material include, for example, various kinds of damping alloys such as a magnesium alloy, an iron-based alloy, a copper alloy, a manganese alloy, and a Ni—Ti-based alloy.

Case Member

The cap 24 as a case member has a box-like shape, and is fixed at the portion of the flange 21 to the pedestal 20 so as to cover the substrate 11. The cap 24 includes a substantially rectangular opening along the flange 21 of the pedestal 20, and is bonded to the pedestal 20 with a resin adhesive or the like with the opening disposed to face the pedestal 20. As the method for bonding the cap 24 to the pedestal 20, screws may be used.

As the constituent material of the cap 24, a material obtained by subjecting a thin place such as aluminum, stainless steel, an iron-based alloy, or a copper-based alloy to surface treatment is used, and the cap 24 formed by press molding or the like is preferably applied. Specifically, a material whose linear expansion coefficient in the first direction is smaller than a linear expansion coefficient of the adhesive member 91 in the first direction (direction along the direction of the first surface 11a and the second surface 11b of the substrate 11) described above is preferably used for the cap 24 as a case member. In this case, also a linear expansion coefficient of the substrate 11 in the first direction is preferably smaller than the linear expansion coefficient of the adhesive member 91 in the first direction. With this configuration, since the substrate 11 and the inner wall of the cap 24 as a case member facing the substrate 11 are connected by means of the adhesive member 91 whose linear expansion coefficient is larger than those of the substrate 11 and the cap 24, the deformation of the substrate 11 or the occurrence of stress in association with the deformation, when the sensor unit is exposed to temperature changes such as those that occur during heating to a high temperature and during cooling after heating, is further suppressed, and thus it is possible to suppress a reduction in the detected value of the amount of inertia in the sensor unit 10 due to temperature changes.

The constituent material of the cap 24 is not particularly limited to the metal and alloy materials described above when a material whose characteristics such as a linear expansion coefficient are proper is used as the constituent material of the adhesive member 91, and various kinds of resin materials or the like can also be used. For example, polyolefin such as polyethylene, polypropylene, and ethylene-propylene copolymer, polyester such as polyvinyl chloride, polystyrene, polyamide, polyimide, polycarbonate, poly-(4-methylpentene-1), ionomer, an acrylic resin, polymethylmethacrylate, acrylonitrile-butadiene-styrene copolymer (ABS resin), acrylonitrile-styrene copolymer (AS resin), butadiene-styrene copolymer, polyethylene terephthalate (PET), and polybutylene terephthalate (PBT), polyether, polyether ketone (PEK), polyether ether ketone (PEEK), polyether imide, polyacetal (POM), polyphenylene oxide, polysulfone, polyether sulfone, polyphenylene sulfide, polyarylate, aromatic polyester (liquid crystal polymer), polytetrafluoroethylene, polyvinylidene fluoride, and in addition to these, a fluorine-based resin, an epoxy resin, a phenol resin, a urea resin, a melamine resin, a silicone resin, polyurethane, or the like, or copolymers, blends, polymer alloys, and the like, which contain these as a main component, may be exemplified, and one kind or two kinds or more of these can be combined to be used.

Here, the assembly process of the sensor unit 10, which has been briefly mentioned above, will be described.

In the assembly process of the sensor unit 10 having the configuration described above, electronic components such as the first sensor device 23, the second sensor device 18, the IC chip 17, the connector 14, and the other electronic components 15 are first mounted on the substrate 11. Next, the substrate 11 on which the electronic components are mounted is positioned and fixed to the pedestal 20. Next, in a state where the cap 24 is placed with the opening facing upward, a predetermined amount of the adhesive member 91 in the form of liquid or gel before curing is put through the opening of the cap 24. Then, from the opening side of the cap 24 in which the predetermined amount of the adhesive member 91 has been put, the pedestal 20 to which the substrate 11 with the electronic components mounted thereon is fixed is fitted while performing positioning, and the cap 24 and the pedestal 20 are fixed together with an adhesive. Then, the adhesive bonding the cap 24 and the pedestal 20 together, and the adhesive member 91 in a state of being filled in the gap between the first surface 11a of the substrate 11 on which the first sensor device 23 and the second sensor device 18 are mounted and the inner wall of the cap 24, are cured by heating or the like, so that a series of manufacturing processes of the sensor unit 10 are finished.

Figure 5:
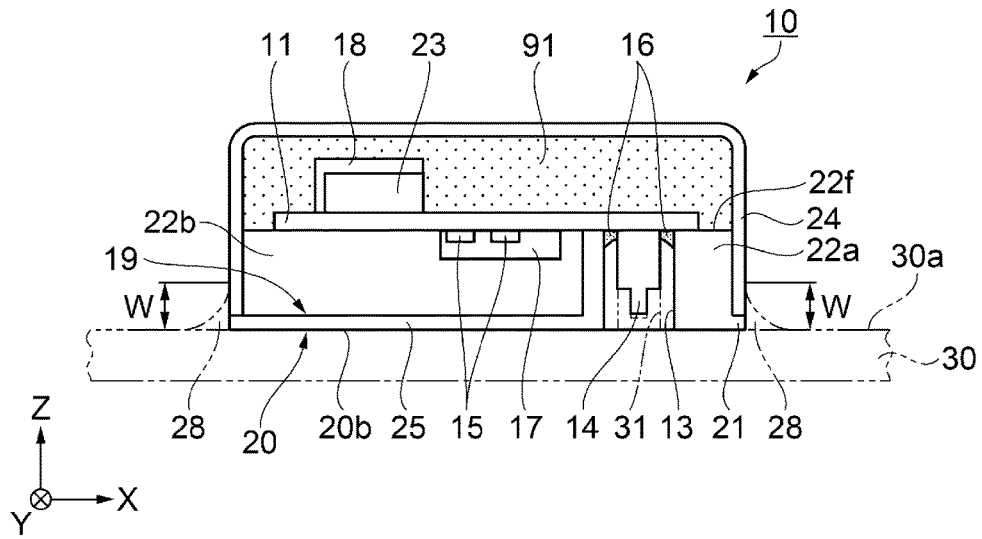
FIG. 5 is a front cross-sectional view showing a mounting example of the sensor unit.

Configurations for mounting the sensor unit 10 described above on a mounting substrate will be described using FIG. 5. FIG. 5 is a front cross-sectional view showing a mounting example of the sensor unit. In the drawing, the same configurations as those of the embodiment described above are denoted by the same reference numerals and signs, while the configurations according to the mounting substrate are represented by the dashed-double dotted lines. The description of the same configurations as those of the embodiment described above is omitted.

As shown in FIG. 5, the sensor unit 10 is connected such that a connector 31 (female connector) on the mounting substrate 30 side is inserted into the connector 14 (male connector) and also that the lower surface 20b of the pedestal 20 is disposed so as to lie on an upper surface 30a of the mounting substrate 30. In this manner, the connector 14 of the sensor unit 10 and the connector 31 of the mounting substrate 30 are directly connected together. An example in which the connector 14 is a male connector and the connector 31 is a female connector has been described; however, the configurations may be reversed, that is, the connector 14 may be a female connector and the connector 31 may be a male connector.

An outer peripheral lower portion (region indicated by reference sign W in the drawing) of the sensor unit 10 may be bonded with an adhesive 28 or the like. With this bonding, the sensor unit 10 can be more securely bonded to the mounting substrate 30. The adhesive 28 may be applied between the bottom surface (the lower surface 20b of the base 25 of the pedestal 20) of the sensor unit 10 and the mounting substrate 30. By applying the adhesive 28 over the entire outer peripheral lower portion of the sensor unit 10, a sealing effect is produced. By applying the adhesive 28 over the entire outer peripheral lower portion of the sensor unit 10 in this manner, it is possible to prevent the entry of a foreign substance through the through-hole 13 located in the bottom surface (the lower surface 20b of the base 25 of the pedestal 20) of the sensor unit 10.

Moreover, treatment for improving the wettability of the adhesive 28 is preferably performed on a portion of the surface of the cap 24 located in the outer peripheral lower portion (region indicated by reference sign W in the drawing) of the sensor unit 10. As a method for this treatment, treatment for roughening the surface of the cap 24 by honing or etching (for example, MAT treatment) or the like can be used. When aluminum is used for the material of the cap 24, a method can be applied in which alumite treatment is performed on the cap 24 except for the region indicated by reference sign W in the drawing and thus the alumite treatment is not performed on the region indicated by reference sign W in the drawing. The region indicated by reference sign W is preferably about 1 mm in length from the edge of the opening of the cap 24.

By performing the treatment on the outer peripheral lower portion (region indicated by reference sign W in the drawing) of the sensor unit 10, the wettability of the adhesive 28 in the region indicated by reference sign W in the drawing can be improved, and the coating of the adhesive can be reliably performed. Moreover, the flowing of the adhesive 28 to the sensor unit 10 other than the region indicated by reference sign W in the drawing can be prevented. Due to these, the coating amount of the adhesive 28 is stabilized, and the sealing effect can be more reliably provided.

According to the sensor unit 10 of the first embodiment described above, the adhesive member 91 is provided to cover the outer peripheries of the first sensor device 23 and the second sensor device 18 and so as to connect the first sensor device 23 and the second sensor device 18 with the inner wall of the cap 24 in the space formed between the first sensor device 23 and the second sensor device 18, and the cap 24 as a case member. With this configuration, since the substrate 11, and the first sensor device 23 and the second sensor device 18 connected to the substrate 11, are more securely held in the cap 24 by the adhesive member 91, the substrate 11 is less deformable when heated to a high temperature. Therefore, stress applied to the first sensor device 23 and the second sensor device 18 during heating and during cooling in which the sensor unit is returned to a normal temperature is suppressed. Hence, a reduction in the detected value of each of the first sensor device 23 and the second sensor device 18 is suppressed when the sensor unit 10 is exposed to a high temperature or after the sensor unit 10 is returned from a high temperature to a normal temperature. Therefore, it is possible to provide the sensor unit 10 capable of detecting an accurate amount of inertia even when exposed to temperature changes.

Moreover, according to the sensor unit 10 of the first embodiment, the substrate bonding portion 22a, the substrate bonding portion 22b, and the substrate bonding portion 22c, which have a wall thickness thicker than that of the component accommodating portion 19, are provided to extend in the two crossing directions (the X-axis direction and the Y-axis direction). The substrate 11 to which, for example, the first sensor device 23 or the connector 14 is connected is connected to the substrate bonding portions 22a, 22b, and 22c. The substrate bonding portions 22a, 22b, and 22c have high rigidity because the substrate bonding portions are thick in wall thickness and extend in the two crossing directions, and the heights of the bonding surfaces 22f can be integrally aligned based on the bottom surface (the lower surface 20b) of the pedestal 20. Therefore, variations in height can be suppressed, and the bonding posture of the substrate 11 can be stabilized. With this configuration, the posture of the substrate 11 based on the bottom surface (the lower surface 20b as a connection surface to the mounting substrate) of the pedestal 20 can be aligned (reduced in variation). As a result, variations of the sensor devices such as the first sensor device 23 in the detection axis direction can be suppressed, and detection accuracy can be stabilized.

Moreover, according to the sensor unit 10, since the connector 14 is exposed in the through-hole 13 as an opening of the pedestal 20, the connector 31 of the mounting substrate 30 to which the sensor unit 10 is connected and the connector 14 of the sensor unit 10 can be directly connected together. With this configuration, wiring lines, a flexible wiring board, and the like used in the related art become unnecessary, which eliminates an influence on the characteristics of the first sensor device 23 caused by a resonance phenomenon of the wiring lines or flexible wiring board propagating through the substrate to the first sensor device 23 as an inertial sensor. Moreover, since the first sensor device 23 is connected to the substrate 11 in a position other than the connection area R1 where the pedestal 20 and the substrate 11 are connected together, stress fluctuation (thermal strain, vibration, impact, etc.) received from the pedestal 20 is less likely to propagate to the first sensor device 23. Hence, the sensor unit 10 of the example can suppress external resonance vibration, stress fluctuation, or the like, and thus perform more stable measurement.

Second Embodiment

Figure 6:
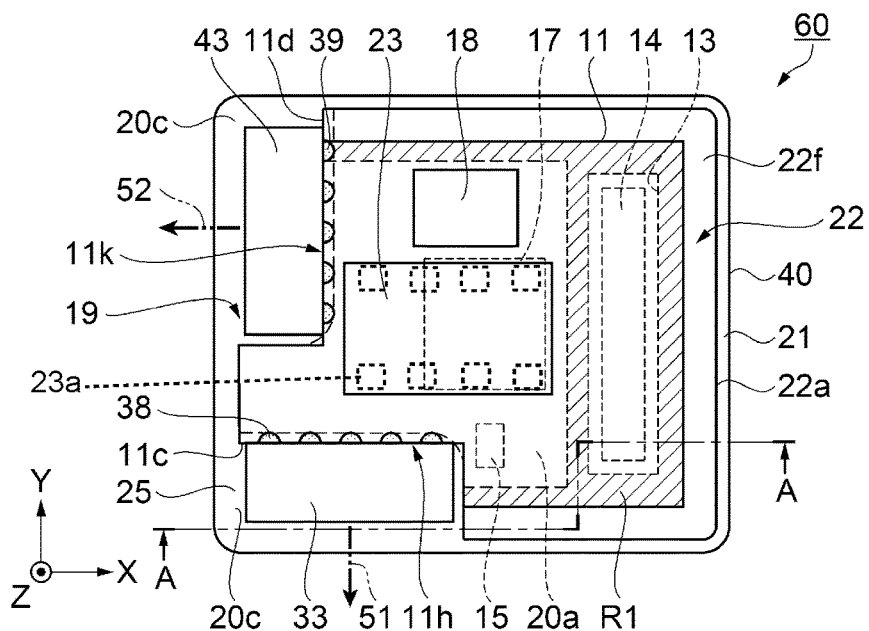
FIG. 6 is a plan view showing a schematic configuration of a sensor unit according to a second embodiment.
Figure 7:
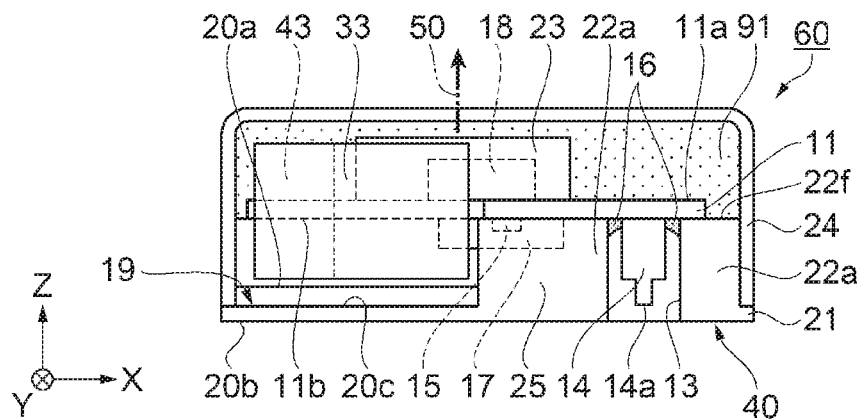
FIG. 7 is a cross-sectional view taken along the line A-A of FIG. 6.
Figure 8:
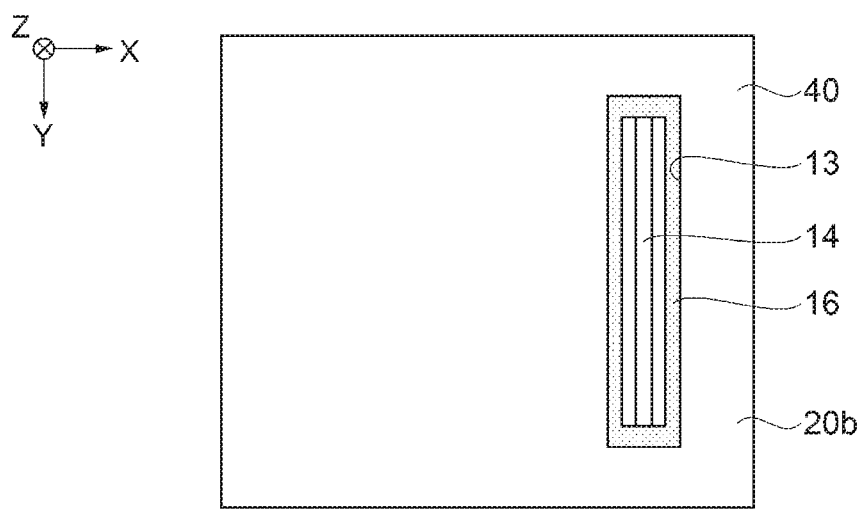
FIG. 8 is a bottom plan view of the sensor unit according to the second embodiment.
Figure 9:
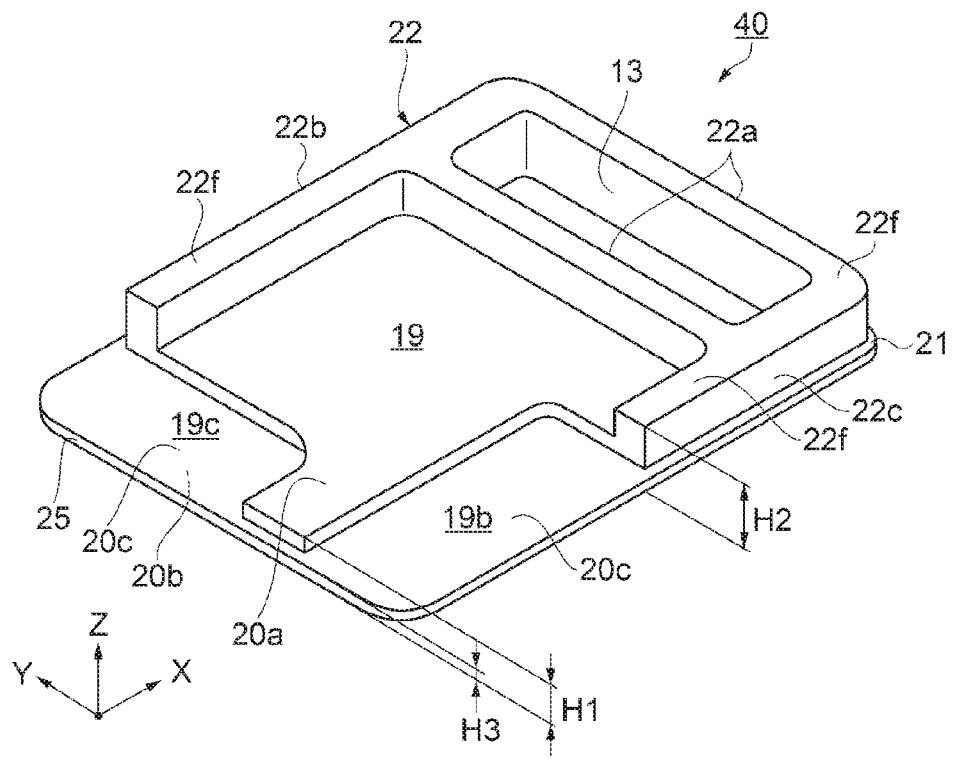
FIG. 9 is a perspective view showing an overview of a pedestal in the second embodiment.

Next, a second embodiment of a sensor unit will be described with reference to FIGS. 6 to 9. FIGS. 6 to 8 show a schematic configuration of the sensor unit according to the second embodiment, in which FIG. 6 is a plan view, FIG. 7 is a cross-sectional view taken along the line A-A of FIG. 6, and FIG. 8 is a bottom plan view. In FIG. 6, for clarity of illustration, the cap as a case member is omitted. FIG. 9 is a perspective view showing an overview of a pedestal in the second embodiment. Configurations similar to those of the first embodiment described above are denoted by the same reference numerals and signs. Moreover, the description of the same configurations may be omitted.

As shown in FIGS. 6 to 8, the sensor unit 60 according to the second embodiment includes the substrate 11 provided with the first sensor device 23 and the second sensor device 18 as sensor devices, a third sensor device 33 and a fourth sensor device 43 as side-surface disposed sensor devices, and the connector 14 connected to the first, second, third, and fourth sensor devices 23, 18, 33, and 43, and the pedestal 40 on which the substrate 11 is placed and which includes the through-hole 13 as an opening through which the connector 14 is exposed. Moreover, the sensor unit 60 includes the cap 24 as a case member connected to the pedestal 40 and covering the substrate 11. The first sensor device 23 and the second sensor device 18 are disposed in a so-called horizontal placement manner on the first surface 11a of the substrate 11 in positions overlapping, in a plan view (as viewed in the Z-axis direction shown in the drawing), the component accommodating portion 19 as a gap provided between the substrate 11 and the pedestal 40. Moreover, the third sensor device 33 and the fourth sensor device 43 are mounted in a so-called vertical placement manner in notch portions 11h and 11k of the substrate 11. The mounting of the first sensor device 23, the third sensor device 33, and the fourth sensor device 43 will be described later. In the embodiment, an example of using inertial sensors as the first sensor device 23, the third sensor device 33, and the fourth sensor device 43 will be described. Hereinafter, the constituent members including other constituent members will be described in detail.

Substrate

The substrate 11 is provided with major surfaces on the front and rear thereof. The substrate 11 includes the first surface 11a as one of the major surfaces, the second surface 11b as the other major surface which is in an opposing relationship with the first surface 11a, and the side surface connecting the first surface 11a with the second surface 11b. In addition, the substrate 11 of the example includes the notch portion 11h and the notch portion 11k at two corner portions. The notch portion 11h includes a side surface 11c in the Y-axis direction orthogonal to the Z-axis direction which is a direction in which the first surface 11a of the substrate 11 faces. The notch portion 11k includes a side surface 11d in the X-axis direction orthogonal to both the Z-axis direction and the Y-axis direction. The substrate 11 is connected with the substrate bonding portions 22a, 22b, and 22c of the pedestal 40, described later, in the position of the connection area R1 indicated by hatching in the drawing. The substrate 11 is formed of an insulator such as, for example, resin or ceramic. Wiring patterns (mounting wiring lines, conductive terminals, electrodes, etc.) formed from a conductive material through, for example, plating deposition are formed on the first surface 11a and the second surface 11b of the substrate 11. Moreover, conductive terminals for mounting the third sensor device 33 and the fourth sensor device 43, described later, are disposed on the first surface 11a along the edges (outline of the first surface 11a) of the notch portions 11h and 11k. These wiring patterns (mounting wiring lines, conductive terminals, electrodes, etc.) are not shown in the drawings.

The first sensor device 23 and the second sensor device 18 are mounted in an area overlapping the component accommodating portion 19 in the plan view (viewed in the Z-axis direction), on the first surface 11a of the substrate 11 connected to the pedestal 40. The first sensor device 23 as an inertial sensor has a flat, substantially rectangular parallelepiped outer shape, and the outline of the outer surface is formed into an oblong shape. External electrodes as a plurality of electrodes 23a are disposed on the outer surface of the first sensor device 23. The first sensor device 23 is located in the area overlapping the component accommodating portion 19 in the plan view, and is disposed with the bottom surface as an outer surface lying on the first surface 11a of the substrate 11. The first sensor device 23 is mounted on the substrate 11 while electrical connections are provided between the electrodes 23a provided on the outer surface and the conductive terminals provided on the substrate 11. For connection in mounting, a bonding material such as, for example, a solder material is used, but is not shown in the drawings. The first sensor device 23 is composed of an angular velocity sensor having one detection axis 50, that is, a gyro sensor. In the angular velocity sensor, the detection axis 50 is orthogonal to the bottom surface, and an angular velocity about the detection axis 50 is detected.

Further, the third sensor device 33 is mounted on the side surface 11c of the notch portion 11h of the substrate 11. External electrodes as a plurality of electrodes (not shown) are disposed on the outer surface (bottom surface) of the third sensor device 33. The third sensor device 33 is located in an area overlapping, in the plan view, a step portion 19b (see FIG. 9) in the component accommodating portion 19, and is mounted on (fixed to) the substrate 11 in a state where the bottom surface of the third sensor device 33 faces and abuts the side surface 11c of the notch portion 11h. The third sensor device 33 is mounted while electrical connections are provided between the electrodes (not shown) provided on the bottom surface (outer surface) thereof and conductive terminals (not shown) provided along the edge of the notch portion 11h by means of conductors 38 as a bonding material such as, for example, a solder material. The third sensor device 33 is composed of an angular velocity sensor having one detection axis 51, that is, a gyro sensor. In the angular velocity sensor, the detection axis 51 is orthogonal to the bottom surface, and an angular velocity about the detection axis 51 along the Y-axis direction is detected.

Similarly to the third sensor device 33, also the fourth sensor device 43 is mounted on the substrate 11. The fourth sensor device 43 is disposed in the notch portion 11k of the substrate 11. A plurality of electrodes (not shown) are disposed on the outer surface (bottom surface) of the fourth sensor device 43. The fourth sensor device 43 is located in an area overlapping, in the plan view, a step portion 19c (see FIG. 9) in the component accommodating portion 19, and is mounted on (fixed to) the substrate 11 in a state where the bottom surface of the fourth sensor device 43 faces and abuts the side surface 11d of the notch portion 11k. The fourth sensor device 43 is mounted while electrical connections are provided between the electrodes (not shown) provided on the bottom surface (outer surface) thereof and conductive terminals (not shown) provided along the edge of the notch portion 11k by means of conductors 39 as a bonding material such as, for example, a solder material. The fourth sensor device 43 is composed of an angular velocity sensor having one detection axis 52, that is, a gyro sensor. In the angular velocity sensor, the detection axis 52 is orthogonal to the bottom surface, and an angular velocity about the detection axis 52 along the X-axis direction is detected.

The second sensor device 18 is composed of, for example, an acceleration sensor. In the example, a sensor capable of detecting an acceleration in a uniaxial (the detection axis 50) direction is illustrated, and an acceleration can be detected along the detection axis 50. The second sensor device 18 may be composed of, for example, a triaxial acceleration sensor capable of detecting accelerations in multiaxial directions. When a triaxial acceleration sensor is used, an acceleration can be detected along three orthogonal axes.

The adhesive member 91 is provided in the space formed by the first surface 11a of the substrate 11 on which the first sensor device 23, the third sensor device 33, the fourth sensor device 43, and the second sensor device 18 are mounted and the cap 24 as a case member. In the third sensor device 33 and the fourth sensor device 43 of these sensor devices, the adhesive member 91 is provided so as to connect the outer peripheries of portions projecting on the first surface 11a side of the substrate 11 with the cap 24.

Here, when the third sensor device 33 and the fourth sensor device 43 are sensor devices each of which includes a vibrator and a package member accommodating the vibrator and is of a type that detects an angular velocity or acceleration based on a change in the frequency of the vibrator vibrationally driven, connecting the package member and the case member with the adhesive member 91 as described above means that the substrate and the case member are connected through the package member. By changing the connection status of the vibration element of the substrate system in this manner, a difference between the natural frequency of the substrate system and the drive frequency of the vibrator can be increased. With this configuration, it is possible to prevent the occurrence of an output abnormal drop of the sensor device caused by the occurrence of a resonance phenomenon due to the frequencies of the substrate system and the vibrator being close to each other.

The connector 14, the other electronic components 15 such as a chip resistor and a chip capacitor, the IC chip (integrated circuit) 17, and the like are mounted on the second surface 11b, which is one of the major surfaces of the substrate 11 and in an opposing relationship with the first surface 11a. For connection in mounting, a bonding material such as, for example, a solder material is used. The chip resistor or the chip capacitor may be used to improve output characteristics from the sensor device. Moreover, the connector 14, the other electronic components 15, the IC chip (integrated circuit) 17, and the like are electrically connected to each other by wiring patterns (not shown). The connector 14 is attached to the second surface 11b of the substrate 11 such that the bottom surface (fixed surface) of the connector 14 is disposed so as to lie on the second surface 11b of the substrate 11. The connector 14 is attached in this manner, so that the direction of the detection axis 50 of the first sensor device 23 and the insertion direction of the connector 14 can be aligned through the substrate 11.

In the above description, an example has been described, in which the first sensor device 23 and the second sensor device 18 are mounted on the first surface 11a of the substrate 11 while the connector 14, the electronic components 15, the IC chip (integrated circuit) 17, and the like are mounted on the second surface 11b; however, the mounting surfaces and combinations are not specified. For example, a configuration may be employed, in which the electronic components 15, the IC chip (integrated circuit) 17, and the like are mounted on the first surface 11a while the connector 14, the first sensor device 23, the second sensor device 18, and the like are mounted on the second surface 11b.

Pedestal

Here, the pedestal 40 will be described in detail with reference also to FIG. 9. The pedestal 40 is provided so as to face the second surface 11b of the substrate 11. The pedestal 40 is provided with the plate-like base 25 provided so as to face the second surface 11b of the substrate 11, and the substrate bonding portions 22a, 22b, and 22c projecting from the base 25 toward the second surface 11b of the substrate 11 along the outer periphery of the base 25. The pedestal 40 includes the lower surface (outer bottom surface) 20b, the upper surface 20a that is in an opposing relationship with the lower surface 20b and is the inner bottom surface of the base 25, and the bonding surfaces 22f that are upper surfaces of the substrate bonding portions 22a, 22b, and 22c and bonded to the substrate 11. The bonding surfaces 22f of the substrate bonding portions 22a, 22b, and 22c are formed flush with each other. The substrate bonding portions 22a, 22b, and 22c have the thickness H2 (wall thickness: the thickness between the bonding surface 22f and the lower surface 20b) larger than the thickness H1 (wall thickness: the thickness between the upper surface 20a and the lower surface 20b) of the base 25. That is, the substrate bonding portions 22a, 22b, and 22c project from the upper surface 20a of the base 25. In the example, the projecting portion 22 is formed of the substrate bonding portion 22a located at an edge portion in the X-axis direction and extending in the Y-axis direction, and the substrate bonding portions 22b and 22c located at both edge portions in the Y-axis direction and extending in the X-axis direction.

The step portion 19b and the step portion 19c each having a step from the upper surface 20a and having a thickness H3 that is a further thinner wall thickness than that of the portion of the upper surface 20a are provided at the two corner portions on the side opposite to the side where the substrate bonding portion 22a is provided. The third sensor device 33 and the fourth sensor device 43, described above, are disposed on the step portion 19b and the step portion 19c. By providing the step portions 19b and 19c in this manner, areas with different thicknesses are provided in the component accommodating portion 19, and the rigidity of the component accommodating portion 19 can be increased. With this configuration, also the rigidity of the pedestal 40 is increased, which makes it difficult to cause the deformation or the like of the pedestal 40. A space area formed by the inner side surfaces of the substrate bonding portions 22a, 22b, and 22c projecting, the upper surface 20a of the base 25, and upper surfaces 20c of the step portion 19b and the step portion 19c serves as the component accommodating portion 19.

Further, the through-hole 13 penetrating from the bonding surface 22f to the lower surface 20b is provided in the substrate bonding portion 22a of the pedestal 40. The through-hole 13 is provided to accommodate the connector 14 connected to the substrate 11 when the substrate 11 is connected to the pedestal 40 as will be described later. The through-hole 13 is a hole having a shape slightly larger than the outer shape of the connector 14. The through-hole 13 of the example is a hole having a rectangular opening. Moreover, the pedestal 40 is provided with the flange 21 provided in a thin-walled shape at the outer peripheral edge portion of the base 25.

In the connection area R1 including the outer peripheral portion of the substrate 11 and the outer peripheral portion of the through-hole 13 into which the connector 14 is inserted, the substrate 11 is connected on the substrate bonding portions 22a, 22b, and 22c, and thus the substrate 11 is supported on the pedestal 40. The support of the substrate 11 on the pedestal 40 is similar to that of the first embodiment described above, and therefore, the description thereof is omitted herein.

The height of the projecting portion 22 based on the upper surface 20a is set such that, when the substrate 11 is connected to the projecting portion 22, the input/output surface 14a of the connector 14 is contained within the through-hole 13. In other words, when the substrate is connected to the projecting portion 22, the input/output surface 14a of the connector 14 is located on the inside (the upper surface 20a side) of the lower surface 20b (lower surface of the pedestal 40) of the base 25. With the configuration described above, even when the unexpected happens, the connector 14 can be prevented from being subjected to an impact or load, and the breakage of the connector 14 can be prevented. The filling material 16 is disposed in the gap between the through-hole 13 and the outer peripheral portion of the connector 14. Since the gap is filled with the filling material 16 as described above, the opening to the lower surface (the lower surface 20b of the base 25) of the pedestal 40 is closed. Therefore, it is possible to prevent the entry of a foreign substance such as moisture or dust from the lower surface side of the pedestal 40 into the component accommodating portion 19 as a gap provided between the substrate 11 and the pedestal 40.

Moreover, when the substrate 11 is connected on the substrate bonding portions 22a, 22b, and 22c of the pedestal 40, the third sensor device 33 and the fourth sensor device 43 are disposed such that gaps are provided between the upper surfaces 20c of the step portion 19b and the step portion 19c and the third sensor device 33 and the fourth sensor device 43. By providing the gaps in this manner, an external impact received by the pedestal 40 or stress such as deformation can be prevented from directly transferring to the sensor devices such as the third sensor device 33 and the fourth sensor device 43, and thus the detection accuracy of the sensor devices can be increased.

By configuring the pedestal 40 as described above, the substrate 11 can be easily supported, and also, the space (the component accommodating portion 19) for accommodating the other electronic components 15 such as a chip resistor and a chip capacitor, the IC chip (integrated circuit) 17, and the like can be secured between the substrate 11 and the base 25. When the substrate 11 is fixed in this manner, a space is formed between the substrate 11 and the base 25, and the electronic components 15, the IC chip (integrated circuit) 17, and the like are accommodated in the space. With this configuration, contact between these components and the pedestal 40 is prevented, and the reliability of the sensor unit 60 is improved. Moreover, the cap 24 as a case member described later is bonded to the flange 21. The cap 24 can be easily bonded to the pedestal 40 using, for example, a resin adhesive containing an epoxy resin as a base material. The cap 24 as a case member is similar to that of the first embodiment described above, and therefore, the description thereof is omitted in the embodiment.

The constituent material of the pedestal 40 is not particularly limited, but is preferably a material having damping characteristics. With this configuration, unwanted vibration of the substrate 11 is suppressed, which improves the detection accuracy of the first sensor device 23, the second sensor device 18, the third sensor device 33, and the fourth sensor device. Examples of the material include, for example, various kinds of damping alloys such as a magnesium alloy, an iron-based alloy, a copper alloy, a manganese alloy, and a Ni—Ti-based alloy.

The sensor unit 60 described above can be mounted on a mounting substrate similarly to the first embodiment described above. The mounting configuration, the surface treatment of the cap 24, and the like are similar to those of the first embodiment, and therefore, the description thereof is omitted.

The sensor unit 60 of the second embodiment described above has advantageous effects similar to those of the first embodiment described above, and also has the following advantageous effects. In the description herein, the description of advantageous effects that are duplicative of those in the first embodiment is omitted, and different advantageous effects will be described.

In the sensor unit 60 of the second embodiment, the third sensor device 33 is mounted on the side surface 11c of the notch portion 11h of the substrate 11, and the fourth sensor device 43 is mounted on the side surface 11d of the notch portion 11k of the substrate 11. In this manner, the sensor devices are mounted to face the side surfaces 11c and 11d of the substrate 11, and the electrodes of the third sensor device 33 and the fourth sensor device 43 and the conductive terminals of the substrate 11 are electrically and mechanically fixed reliably by means of the conductors 38 and 39 as a bonding material, whereby it is possible to provide a small, low-profile sensor unit using an existing sensor package. Moreover, in the sensor unit 60, the pedestal 40 is provided with the step portions 19b and 19c. By providing the step portions 19b and 19c as described above, the dimension of the sensor unit in the height direction can be reduced.

Moreover, in the sensor unit 60 of the embodiment, the adhesive member 91 is provided so as to connect the third sensor device 33 mounted on the side surface 11c of the notch portion 11h of the substrate 11 and the fourth sensor device 43 mounted on the side surface 11d of the notch portion 11k of the substrate with the inner wall of the cap 24 as a case member. That is, the adhesive member 91 is disposed, not only on the first surface 11a side of the substrate 11 on which the first sensor device 23 and the second sensor device 18 are mounted, but also in spaces between the inner wall of the cap 24 and the third sensor device 33 and the fourth sensor device 43 on the side surface 11c side and the side surface 11d side of the substrate 11 on which the third sensor device 33 and the fourth sensor device 43 are mounted.

With this configuration, the substrate 11 on which the sensor devices are mounted is held by the adhesive member 91 with respect to the cap 24 more securely than the sensor unit 10 of the first embodiment described above. Hence, it is possible to more remarkably suppress a reduction in the detected value of the amount of inertia due to the deformation of the members or the occurrence of stress in association with the deformation during heating to a high temperature and during cooling after heating, and also, it is possible to realize the sensor unit 60 with high impact resistance.

Moreover, the substrate 11 formed of resin has modes of a plurality of resonant frequencies at a single temperature, that is, has a plurality of resonance points, and it is known that the resonant frequency at each resonance point changes with temperature with a predetermined gradient. Due to this, if the resonant frequency synchronizes with leakage vibration from the sensor element of each of the inertial sensors of the sensor devices, the substrate 11 and the sensor element resonate, which may cause an error in the measured value of inertia. According to the embodiment, the third sensor device 33 and the fourth sensor device 43, and the cap 24 are held by the adhesive member 91, whereby vibration leakage of the sensor element of the inertial sensor included in each of the third sensor device 33 and the fourth sensor device 43 is suppressed. Hence, the leakage vibration from the inertial sensor (sensor element) of each of the sensor devices is suppressed, which provides an advantageous effect that can suppress an error in the measurement of inertia due to the resonance of the substrate 11.

Modified Example of Pedestal

Figure 10:
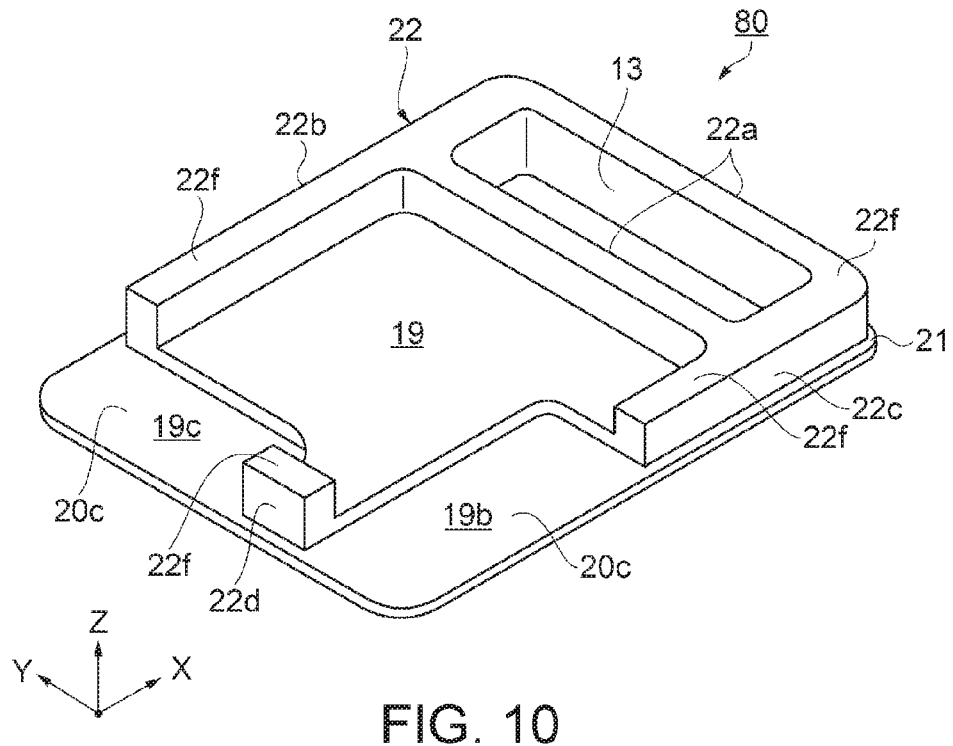
FIG. 10 is a perspective view showing a modified example of a pedestal.

A modified example of a pedestal will be described with reference to FIG. 10. FIG. 10 is a perspective view showing the modified example of the pedestal. The pedestal 80 shown in FIG. 10 differs from the pedestal 40 described in the second embodiment in the configuration of the substrate bonding portions. In the description, configurations different from the pedestal 40 of the second embodiment are described, and the description of similar configurations is omitted.

The pedestal 80 is provided with a substrate bonding portion 22d, in addition to the substrate bonding portions 22a, 22b, and 22c provided in the pedestal 40 of the second embodiment. The substrate bonding portion 22d is located on the edge side on the side opposite to the edge where the substrate bonding portion 22a is provided, and is provided between the step portion 19b and the step portion 19c. The substrate bonding portion 22d includes an upper surface having a height flush with the other substrate bonding portions 22a, 22b, and 22c.

According to the pedestal 80, outer peripheries in four directions in the substrate 11 can be connected. Therefore, compared with the pedestal 40 of the second embodiment, the fluttering or flexing of the substrate 11 connected is still less likely to occur, and thus the bonding reliability of the third sensor device 33, the fourth sensor device 43, and the connector 14 connected to the substrate 11 can be increased. Moreover, detachment of the connector 14 can be more smoothly performed reliably.

Modified Example of Sensor Unit

Figure 11:
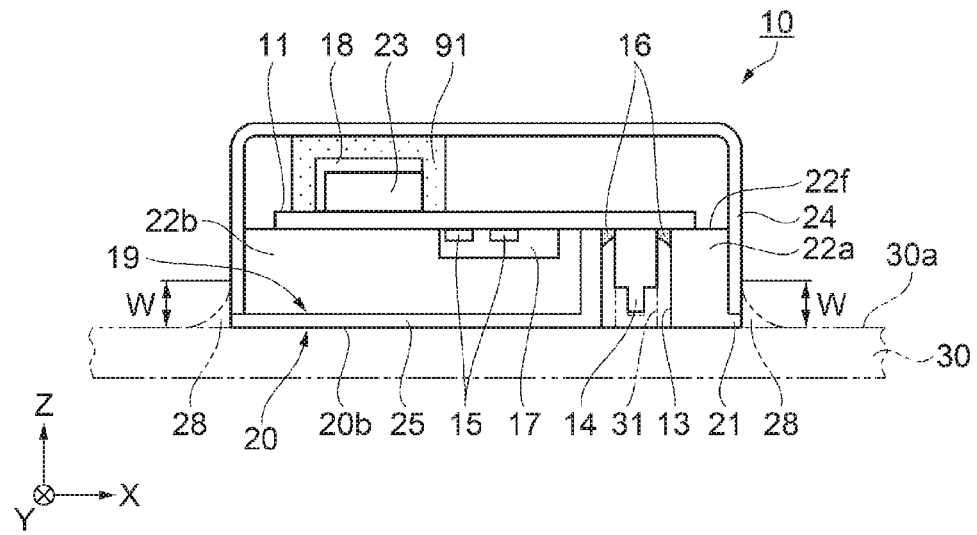
FIG. 11 is a front cross-sectional view showing a modified example of a sensor unit.

Next, a modified example of a sensor unit will be described with reference to FIG. 11. FIG. 11 is a front cross-sectional view showing the modified example of the sensor unit. The sensor unit 110 shown in FIG. 11 differs from the sensor unit 10 (see FIGS. 1 to 3) described in the first embodiment in the form of the filling state of a filling member. Hereinafter, in the description of the modified example, configurations different from the adhesive member 91 of the first embodiment are described; while similar configurations are denoted by the same reference numerals and signs, and the detailed description thereof is omitted.

As shown in FIG. 11, in the sensor unit 110 of the modified example, the adhesive member 91 provided so as to connect the first surface 11a side of the substrate 11 on which the first sensor device 23 and the second sensor device 18 are mounted with the cap 24 as a case member is provided to cover the inner wall of the cap 24 accommodating the first sensor device 23 and the second sensor device 18 and the outer peripheries of the first sensor device 23 and the second sensor device 18 in the plan view of the substrate 11 as viewed from the cap 24 side, and so as to connect the first sensor device 23 and the second sensor device 18 with the cap 24 in the area where the adhesive member 91 covers the outer peripheries of the first sensor device 23 and the second sensor device 18.

In the sensor unit 10 of the first embodiment described above, a configuration has been shown in which the adhesive member 91 is filled and solidified in the entire space formed by the first surface 11a of the substrate 11 on which the first sensor device 23 and the second sensor device 18 are mounted and the cap 24 as a case member (see FIGS. 1 to 3). The adhesive member 91 is not limited to this configuration. As in the sensor unit 110 of the modified example, according to the configuration in which the adhesive member 91 is provided so as to connect the first sensor device 23 and the second sensor device 18 with the cap 24 in the area where the adhesive member 91 covers the inner wall of the cap 24 accommodating at least the first sensor device 23 and the second sensor device 18 and the outer peripheries of the first sensor device 23 and the second sensor device 18 in the plan view of the substrate 11 as viewed from the cap 24 side, advantageous effects substantially similar to the advantageous effects obtained by the configuration of the sensor unit 10 of the embodiment described above can be obtained.

Hereinafter, the invention will be described in detail based on examples; however, the invention is not limited to these examples.

1. Preparation of Sensor Units (Samples)

Sensor units were prepared using, in a plurality of combinations, the main members constituting the sensor units described in the embodiments and modified examples while changing some members as shown in the examples below. Here, in the characteristics of the members used, the linear expansion coefficient (linear expansion coefficient in the direction along the "first direction" described above), which was considered to particularly contribute to the advantageous effects of the invention, was measured and specified. For the measurement of the linear expansion coefficient, any of the following methods for measuring thermal expansion according to the JIS standard was used for each of the kinds of the members.

<Metal-based material> JIS 2285: 2003 "Measuring method of coefficient of linear thermal expansion of metallic materials, etc."

<Resin-based material> JIS K7197 "Testing method for linear thermal expansion coefficient of plastics by thermomechanical analysis"

Moreover, in the configurations of the sensor unit, the following configurations 1-(1) to 1-(3) including the kinds of the members are common to the examples described later.

1-(1) As the form of the arrangement of the adhesive member, the form of the adhesive member 91 in the sensor unit 110 of the modified example shown in FIG. 11 was employed because differences in characteristics among the members were considered to remarkably appear.

1-(2) As the material of the substrate 11, a general-purpose FR4 substrate was used. The linear expansion coefficient of the substrate 11 was 14 ppm/° C. (13 to 15 ppm/° C.).

1-(3) As a sealing resin of the sensor unit, a molding material for LSI was used. The linear expansion coefficient of the sealing resin was 13 ppm/° C. (12 to 14 ppm/° C.).

2. Stability Evaluation of Acceleration Measured Value after Thermal Stress Application A stability evaluation of the acceleration measured value after thermal stress application was performed on the sensor units obtained in the examples and comparative example, described later, by the evaluation method shown below.

2-(1) Application of Thermal Stress and Measurement of Acceleration after the Application The prepared sensor units were put in a constant-temperature bath, and the constant-temperature bath was heated from a normal temperature to 90° C. After reaching 90° C., the sensor units were left at a high temperature for one hour, and thereafter, the constant-temperature bath was set to a normal temperature and cooled to the normal temperature. Then, after the sensor units were cooled to the normal temperature, measurement of acceleration was started with an acceleration sensor (the second sensor device 18), and the acceleration was measured for 200 hours.

2-(2) Stability Evaluation of Acceleration Measured Value

The rate of change of the acceleration measured value that was continuously measured for 150 hours after the sensor unit was cooled to the normal temperature was checked. The measurement of acceleration was performed on five samples for each level, and the average rate of change of the samples was evaluated, as the rate of change of the acceleration measured value, by the following evaluation criteria.

⊙: less than 1%
○: 1% or more and less than 4%
Δ: 4% or more and less than 11%
x: 11% or more Comparative Example As sensor units of a comparative example, two levels of samples were prepared in which the form of the adhesive member 91, in the configuration of the sensor unit 110 shown in FIG. 11, was changed as follows.
<Level A>: the adhesive member 91 was configured such that the adhesive member 91 was not in contact with the inner wall of the cap 24 and that a gap was provided between the adhesive member 91 and the cap 24.
<Level B>: the adhesive member 91 was configured such that the adhesive member 91 was provided so as to be in contact with the sensor devices (23 and 18) and the inner wall of the cap 24 but did not cover the side surfaces (outer peripheries) of the sensor devices (23 and 18), and that the side surfaces of the sensor devices (23 and 18) were exposed from the adhesive member 91.

For the other members than the members using the common materials described above, the following materials were used.

Case member: aluminum alloy (linear expansion coefficient: 18 to 24 ppm/° C.)

Adhesive member: epoxy-based resin (for electronic component potting; linear expansion coefficient: 41 ppm/° C.)

Then, the above-described measurement of acceleration after thermal stress application and the stability evaluation were performed on each of the prepared samples "Level A" and "Level B". As a result, both "Level A" and "Level B" were evaluated as x.

Example 1

Sample Preparation 1

Next, preparation of sensor units of Example 1 and a stability evaluation result of the acceleration measured value after thermal stress application in the sensor units will be described. In Example 1, four levels of sensor units 110 were formed using, in addition to the members using the common materials described above, the same epoxy-based resin (linear expansion coefficient: 41 ppm/° C.) as that of the comparative example described above for the adhesive member 91, and also using the following four levels of materials as the material of the cap 24.

1a). Aluminum alloy (linear expansion coefficient: 23 ppm/° C.)
1b). Brass (linear expansion coefficient: 20 ppm/° C.)
1c). Stainless steel (linear expansion coefficient: 10.4 ppm/° C.)
1d). Quartz (linear expansion coefficient: 10.3 ppm/° C.)

Evaluation Result 1

As a result of conducting the above-described stability evaluation of the acceleration measured value on each of the samples of Example 1, all of the samples were evaluated as ⊙ (vary good). From this fact, the following considerations were obtained.

1). All of an aluminum alloy, brass, stainless steel, and quartz can be suitably applied as the material of the cap 24 of the sensor unit 110. That is, in the configuration of the sensor unit 110 of Example 1, a material having a linear expansion coefficient of 23 ppm/° C. or less can be more suitably applied for the material of the cap 24. Moreover, it can be said from the viewpoints of material cost, easy processability, and the like that an aluminum alloy and brass are particularly preferable for the material of the cap 24.

2). In the configuration of the sensor unit 110 of Example 1, the linear expansion coefficient of the material of the cap 24 is smaller than the linear expansion coefficient (41 ppm/° C.) of the adhesive member 91. Similarly, the linear expansion coefficient (14 ppm/° C.) of the substrate 11 is smaller than the linear expansion coefficient of the adhesive member 91. These are preferable, in the configuration of the sensor unit 110 in which the adhesive is provided to cover the outer peripheries of the sensor devices mounted on the substrate 11 and so as to connect the sensor devices with the cap 24, because thermal stress among the constituent members is suppressed, and these are considered to be one factor of the favorable evaluation result of Example 1.

3). In the configuration of the sensor unit 110 of Example 1, the linear expansion coefficient (14 ppm/° C.) of the substrate 11 and the linear expansion coefficient (13 ppm/°

C.) of the sealing resin of the sensor device are substantially close to each other. This is preferable because thermal stress between the constituent members of the sensor unit 110 is suppressed, and this is considered to be one factor of the favorable evaluation result of Example 1.

4). In the configuration of the sensor unit 110, the relationship between a thickness h1 of the second sensor device 18 used in the acceleration measurement and a length (thickness of the adhesive member 91 disposed so as to connect the substrate 11 with the cap 24) h2 between the facing surfaces of the substrate 11 and the cap 24 is preferably h2/h1≤2 because the stability of the acceleration measured value can be favorably retained, and is more preferably h2/h1≤1.75. In the configuration of the sensor unit 110 of Example 1, h2=1.73 mm, h1=1.0 mm, and h2/h1=1.73. Hence, it can be said that when the relationship is in the range of h2/h1≤1.75, the stability of the acceleration measured value can be more reliably retained.

Example 2

Sample Preparation 2

Next, Example 2 will be described. In Example 2, four levels of sensor units 110 were formed using, in addition to the members using the common materials described above, aluminum alloy, which is a relatively inexpensive, easily available material in the materials of the case member evaluated as ⊙ (particularly favorable) in Example 1, as the cap 24, and using the following adhesive members 91 having different linear expansion coefficients. For all of the four kinds of adhesive members, an epoxy-based resin for electronic component potting was used.

2a). Epoxy-based adhesive member a (linear expansion coefficient: 64 ppm/° C.)
2b). Epoxy-based adhesive member b (linear expansion coefficient: 81 ppm/° C.)
2c). Epoxy-based adhesive member c (linear expansion coefficient: 93 ppm/° C.)
2d). Epoxy-based adhesive member d (linear expansion coefficient: 101 ppm/° C.)

Evaluation Result 2

A result of conducting the above-described stability evaluation of the acceleration measured value on each of the samples of Example 2 is shown below.

2a). Epoxy-based adhesive member a: ⊙
2b). Epoxy-based adhesive member b: ⊙
2c). Epoxy-based adhesive member c: ⊙
2d). Epoxy-based adhesive member d: ○

The matters described in the considerations (2) to (4) in the evaluation result of Example 1 are applied to Example 2 in the same manner.

From the evaluation result described above, it has been confirmed in the configuration of the sensor unit 110 of Example 2 that the stability of the acceleration measured value is favorably retained when the material used for the adhesive member 91 has a linear expansion coefficient of from 64 ppm/° C. (the epoxy-based adhesive member a) to 93 ppm/° C. (the epoxy-based adhesive member c), and that the rate of change of the acceleration measured value is somewhat increased, although at a practical level, when the linear expansion coefficient exceeds 100 ppm/° C. When adding to this the evaluation result of "Level a)." of Example 1, it can be said that it has been confirmed in the configuration of the sensor unit 110 of Example 2 that when the material used for the adhesive member 91 has a linear expansion coefficient of from 41 ppm/° C. to 93 ppm/° C., the stability of the acceleration measured value is favorably retained.

Here, when observing the linear expansion coefficient relationship between aluminum alloy (linear expansion coefficient: 23 ppm/° C.) as the material of the cap 24 and each of the epoxy-based adhesive members a to d used as the adhesive member 91, the linear expansion coefficient 64 ppm/° C. of the epoxy-based adhesive member a is approximately 2.8 times that of aluminum alloy, the linear expansion coefficient 81 ppm/° C. of the epoxy-based adhesive member b is approximately 3.5 times that of aluminum alloy, the linear expansion coefficient 93 ppm/° C. of the epoxy-based adhesive member c is approximately 4 times that of aluminum alloy, and the linear expansion coefficient 101 ppm/° C. of the epoxy-based adhesive member d is approximately 4.4 times that of aluminum alloy. Hence, it can be said in the configuration of the sensor unit 110 of Example 2 that the linear expansion coefficient of the material used for the adhesive member 91 is preferably four times or less the linear expansion coefficient of the substrate 11 or the cap 24, whichever is larger (in Example 2, the linear expansion coefficient of the cap 24).

Application Example of Sensor Unit

The sensor units 10 and 60 described above can be applied to an electronic apparatus, a moving object, and other machines or the like. Hereinafter, configurations using the sensor unit 10 will be illustrated and described in detail.

Electronic Apparatus

Figure 12:
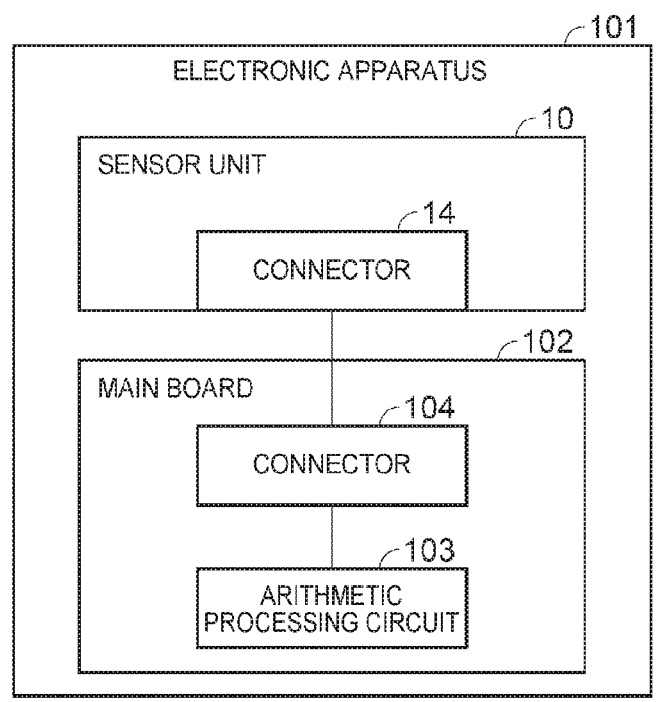
FIG. 12 is a block diagram schematically showing a configuration of an electronic apparatus according to an embodiment.

The sensor unit 10 described above can be incorporated into an electronic apparatus 101 and used as shown in, for example, FIG. 12. In the electronic apparatus 101, an arithmetic processing circuit 103 and a connector 104 are mounted on, for example, a main board (mounting substrate) 102. For example, the connector 14 of the sensor unit 10 can be coupled to the connector 104. A detection signal can be supplied from the sensor unit 10 to the arithmetic processing circuit 103. The arithmetic processing circuit 103 processes the detection signal from the sensor unit 10 and outputs a result of the processing. Examples of the electronic apparatus 101 can include, for example, a motion sensing unit, a consumer game console, a motion analyzer, a surgical navigation system, and an automobile navigation system.

Moving Object

Figure 13:
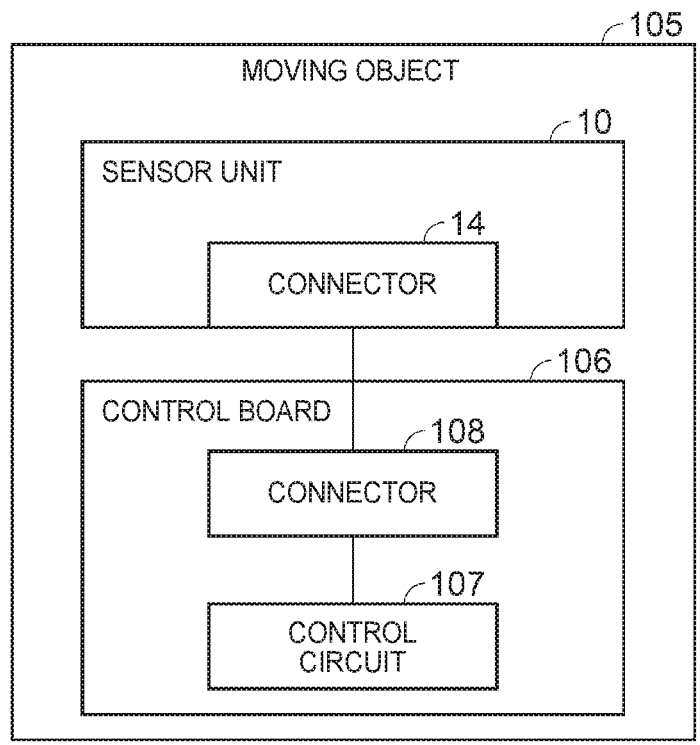
FIG. 13 is a block diagram schematically showing a configuration of a moving object according to an embodiment.

The sensor unit 10 can be incorporated into a moving object 105 and used as shown in, for example, FIG. 13. In the moving object 105, a control circuit 107 and a connector 108 are mounted on, for example, a control board (mounting substrate) 106. For example, the connector 14 of the sensor unit 10 can be coupled to the connector 108. A detection signal can be supplied from the sensor unit 10 to the control circuit 107. The control circuit 107 can process the detection signal from the sensor unit 10 and control the motion of the moving object 105 according to a result of the processing. Examples of the control can include behavior control for a moving object, navigation control for an automobile, activation control for an automobile airbag, inertial navigation control for an airplane or ship, and guidance control.

Other Machines

Figure 14:
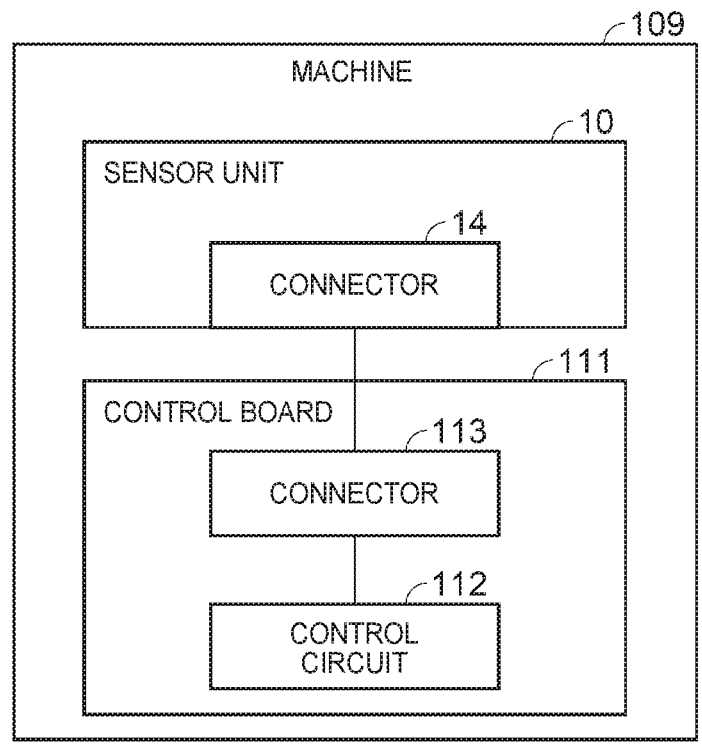
FIG. 14 is a block diagram schematically showing a configuration of a machine according to an embodiment.

The sensor unit 10 can be incorporated into a machine 109 and used as shown in, for example, FIG. 14. In the machine 109, a control circuit 112 and a connector 113 are mounted on, for example, a control board (mounting substrate) 111. For example, the connector 14 of the sensor unit 10 can be coupled to the connector 113. A detection signal can be supplied from the sensor unit 10 to the control circuit 112.

The control circuit 112 can process the detection signal from the sensor unit 10 and control the operation of the machine 109 according to a result of the processing. Examples of the control can include vibration control and operation control for an industrial machine and motion control for a robot.

The embodiments of the invention have been described above in detail; however, those skilled in the art would readily appreciate that many modifications can be made without substantially departing from the novel matter and advantageous effects of the invention. Hence, all of such modified examples are included in the scope of the invention. For example, any term cited with a different term having a broader meaning or the same meaning at least once in the specification and the drawings can be replaced by the different term in any place in the specification and the drawings. Moreover, the configurations and operations of the sensor unit 10, the substrate 11, the first sensor device 23, the second sensor device 18, the electronic components 15, and the like are not limited to those described in the embodiments, and various modifications are possible.

The entire disclosure of Japanese Patent Application No. 2015-172605 filed Sep. 2, 2015 is expressly incorporated by reference herein.

What is claimed is:

1. A sensor unit comprising:
a first sensor device including an inertial sensor;
a second sensor including an acceleration sensor;
a substrate having a first surface and a second surface opposing the first surface, the first sensor device and the second sensor device being, bonded on the first surface;
a case member accommodating at least a portion of the first sensor device and the second sensor device;
an adhesive member disposed on the first surface of the substrate and bonding the first sensor device, the second sensor device, and the case member together and bonding the substrate and the case member together; and
a pedestal supporting the second surface of the substrate, the adhesive member bonding the substrate and the pedestal, wherein
the adhesive member is disposed, in a plan view of the substrate as viewed from a side of the case member, continuously in an area overlapping the first sensor device and the second sensor device and in an outer peripheral area connected to an outer edge of the first sensor device.

2. The sensor unit according to claim 1, wherein
the sensor device includes a sealing resin sealing the inertial sensor and a plurality of electrodes connected to the inertial sensor and disposed on an outer surface of the sealing resin, and
the adhesive member is disposed so as to cover an entire outer surface of the sensor device except for a surface facing the substrate.

3. The sensor unit according to claim 1, wherein the substrate includes a side surface connecting the first surface with the second surface, and
when a first direction is along the first surface and the second surface, a linear expansion coefficient of the adhesive member in the first direction is larger than linear expansion coefficients of the substrate and the case member in the first direction.

4. The sensor unit according to claim 3, wherein the linear expansion coefficient of the adhesive member in the first direction is four times or less the linear expansion coefficient of the substrate or the case member in the first direction, whichever is larger.

5. The sensor unit according to claim 3, wherein the sensor device includes a sealing resin sealing the inertial sensor and a plurality of electrodes connected to the inertial sensor and disposed on an outer surface of the sealing resin, and
the linear expansion coefficient of the substrate in the first direction and a linear expansion coefficient of the sealing resin of the sensor device in the first direction are the same as each other.

6. The sensor unit according to claim 3, wherein between a thickness (h1) of the sensor device and a thickness (h2) of the adhesive member in an area where the substrate and the case member are connected together in a normal direction of the first surface, a relationship: $h2/h1 \leq 2$ is established.

7. The sensor unit according to claim 3, wherein the substrate includes conductive terminals disposed along an outline of the first surface, and
the sensor unit further includes a side-surface disposed sensor device fixed to the substrate such that an outer surface of the side-surface disposed sensor device faces the side surface of the substrate and electrodes disposed on the outer surface and the conductive terminals are bonded together with conductors.

8. The sensor unit according to claim 7, wherein the side-surface disposed sensor device is an angular velocity sensor disposed to detect an angular velocity about an axis along the first direction.

9. The sensor unit according to claim 1, further comprising:
a third sensor device including an angular velocity sensor; and
a fourth sensor device including an angular velocity sensor,
wherein the third sensor device and the fourth sensor device are disposed on a side surface of the substrate.

10. The sensor unit according to claim 9, wherein the adhesive member bonds an outer periphery of the first sensor device, the second sensor device, the third sensor device, and the fourth sensor device disposed only on a first surface side of the substrate.

* * * * *